United States Patent [19]

Sciortino

[11] Patent Number: 4,835,359
[45] Date of Patent: May 30, 1989

[54] METHOD OF MANUFACTURING HEMISPHERICAL TANK HEADS

[75] Inventor: John L. Sciortino, Yorba Linda, Calif.

[73] Assignee: Commercial Shearing, Inc., Youngstown, Ohio

[21] Appl. No.: 156,867

[22] Filed: Feb. 18, 1988

[51] Int. Cl.$^4$ .............................................. B23K 9/00
[52] U.S. Cl. ...................... 219/121.59; 219/121.45; 219/121.46; 219/121.58; 219/137 R; 219/158; 29/463; 29/464; 228/171
[58] Field of Search .......... 219/121.63, 137 R, 121.37, 219/121.38, 121.59, 121.13, 121.14, 121.45, 121.46; 29/463, 464; 228/170, 171

[56] References Cited

U.S. PATENT DOCUMENTS

| | | | |
|---|---|---|---|
| 2,118,388 | 5/1938 | Zerbe | 113/112 |
| 2,579,646 | 12/1951 | Branson | 29/758.2 |
| 3,164,894 | 1/1965 | Johnson et al. | 29/412 |
| 3,514,839 | 6/1970 | Rodrigues | 29/463 |
| 3,757,411 | 9/1973 | Umholtz et al. | 29/416 |
| 3,816,696 | 6/1974 | Wheeler et al. | 219/161 |
| 3,912,151 | 10/1975 | Martin et al. | 228/171 |
| 4,049,414 | 9/1977 | Smith | 219/57 |

FOREIGN PATENT DOCUMENTS

| | | | |
|---|---|---|---|
| 0151848 | 8/1985 | European Pat. Off. | 219/121.63 |
| 0176490 | 8/1986 | Japan | 219/121.63 |

Primary Examiner—M. H. Paschall
Attorney, Agent, or Firm—Buchanan Ingersoll

[57] ABSTRACT

A method of manufacturing hemispherical tank heads is disclosed in which a pair of planar lune members having a generally football shape are cut from flat metal stock. The members are each then formed into a three dimensional lune section having a generally orange-peel sectional shape. Each section is placed onto a trim jig and a first edge of the sections are trimmed to leave some excess material beyond a desired trim line. A second edge of each section is then trimmed to a desired trim line. The two trimmed sections are placed on a joining jig with the second edges of the sections juxtaposed and joined to form a hemispherical member. Finally, the hemispherical member is placed onto the trim jig and the excess materials on the first edges is trimmed to form an accurate hemispherical tank head. Preferably, the trim jig is rotated relative to a stationary plasma torch during all trimming operations.

12 Claims, 2 Drawing Sheets

METHOD OF MANUFACTURING HEMISPHERICAL TANK HEADS

FIELD OF THE INVENTION

The present invention relates to a method of manufacturing hemispherical tank heads. More specifically, the present invention relates to an accurate and simplified method of manufacturing such tank heads from a pair of metal planar lune members.

DESCRIPTION OF THE PRIOR ART

The formation of spherical or hemispherical members from the welding together of plural orange-peel like segments of metal is known in the art. Such members, however, generally require the interconnection of four or more segments to form the desired hemispherical or spherical body. This is particularly true in the manufacture of large (greater than 48 inches) hemispherical tank heads. The process of aligning and interconnecting such a large number of such segments is a complicated and time consuming task. Accordingly, existing tank heads, particularly large tank heads, are overly expensive to manufacture. Furthermore, because the interconnection of a number of segments requires each segment to be properly aligned, it is often difficult to provide a desired degree of accuracy in the finished product.

SUMMARY OF THE INVENTION

The method of the present invention provides a solution to the above problems by forming hemispherical tank heads from only two interconnected orange-peel like sections. In its simplest form, the present invention involves the cutting of a pair of planar lune members into a generally football shape from a suitable flat metal stock. The planar lune members are then formed into three-dimensioned lune sections having a generally orange-peel sectional shape. Each section is placed into a trim jig means having plural guide members and is adjusted so that a first edge of the section is an equal distance from each of the guide members. Once properly aligned, the first edge is trimmed. The first edge is preferably trimmed in a manner which leaves at least some excess material beyond a desired trim line. After the first edge is trimmed, the section is repositioned in the jig so that a second edge of the section is an equal distance from each of the guide members. The second edge is then trimmed exactly to a desired trim line. This trimming process is performed on each of the two lune sections.

Once the initial trimming has been completed, the two trimmed sections are placed on a joining jig means with the second edges of the sections juxtaposed. The second edges are then joined together to form a generally hemispherical member. Finally, the hemispherical member is placed again into the trim jig means and is adjusted so that the first edges are substantially of equal distance from each of the guide members. The first edges are then trimmed to the desired trim line in order to remove the excess material from the first edges of the two interconnected sections. By following this method, an extremely accurate hemispherical member may be formed.

With the method of the present invention, a plasma torch is also preferably used to cut the planar lune members from stainless steel plates or from any other suitable metal. The planar lune members are preferably cut to have a length approximately one-half a width thereof. Following the cutting of the lune members, the sections are preferably soaked for approximately forty minutes at approximately 1950° F. and water quenched prior to a pressing operation. The pressing of the planar members into three dimensional sections is preferably accomplished by utilizing a press and a series of dies to form the lune members from the center outwardly. The outermost edges of the lune members are preferably not pressed.

During each of the trimming operations of the present invention, the trim jig means is preferably rotated relative to a stationary plasma torch. Further, in a preferred embodiment of the invention, the trimming jig has a circular base member and is positioned into a centering ring mounted to a turntable means during such trimming operations. Finally during the trimming operations, the sections and the hemispherical member are preferably secured to the trim means following adjustment thereon and removable upper extensions of the guide means are preferably removed prior to trimming.

These and other objects and advantages of the present invention will be more fully understood upon reference to the accompanying drawings.

DETAILED DESCRIPTION OF THE PREFERRED EMBODIMENTS

Figure 1:
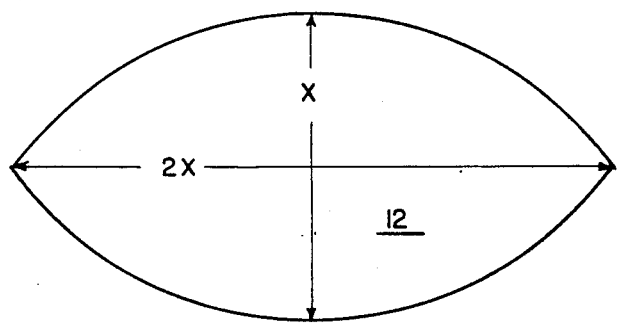
FIG. 1 is a top plan view of a planar lune member cut to have a generally football shape.

Referring to the figures, a plasma torch is preferably utilized for cutting a pair of planar lune members having a generally football shape fromo a flat stainless steel stock. FIG. 1 shows the shape of the planar lune members 12 which preferably have a length 2x twice the greatest width x of the member. For example, the lune member 12 of FIG. 1 may have a total length of 150 inches and a total width of 75 inches. The shape of such a lune member may be formed by the intersection of two circles each having a radius of 92.5 inches with centers of the two circles positioned 110 inches apart. Following the cutting operation, the lune members 12 are placed into a furnace for forty minutes soaking at 1950° F. Members 12 are thereafter immediately removed from the furnace and quenched in water.

Following the quenching, each planar lune member 12 is formed into a three-dimensional lune section having a generally orange-peel sectional shape and an approximate size of a quarter of a sphere. The lune sections are formed by placing lune member 12 into a suitable press and worked from the center outwardly by the application of pressure with suitable die members. For the planar lune member described above, a 44 inch die is utilized until the member is approximately one-third formed. Thereafter, a 34 inch die is utilized to complete the formation of a quarter spherical orange-peel like section. If any wrinkles are formed in the edges of the section during the pressing operation, they may be removed with the 44 inch dies.

Following the forming of three-dimensional lune sections 14, each section is placed into trim jig means 20. Trim jig means 20 preferably includes a circular base 22, securing means 24 and a plurality of guide members 26. Guide members 26 are preferably provided at spaced radial locations on the circular base 22 and include a removable extension plates 27. Each member 26 has an equal height so that the top of extension plates 27 of guide members 26 may be utilized to provide an accurate alignment to allow for the desired trimming of the section 14.

Figure 2:
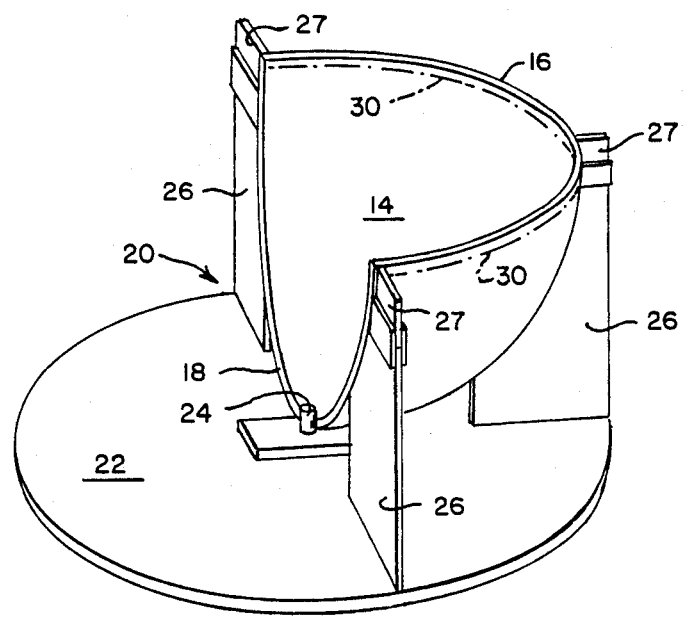
FIG. 2 is an isometric view of the trim jig means of the present invention having a three-dimensional lune section aligned thereon.
Figure 5:
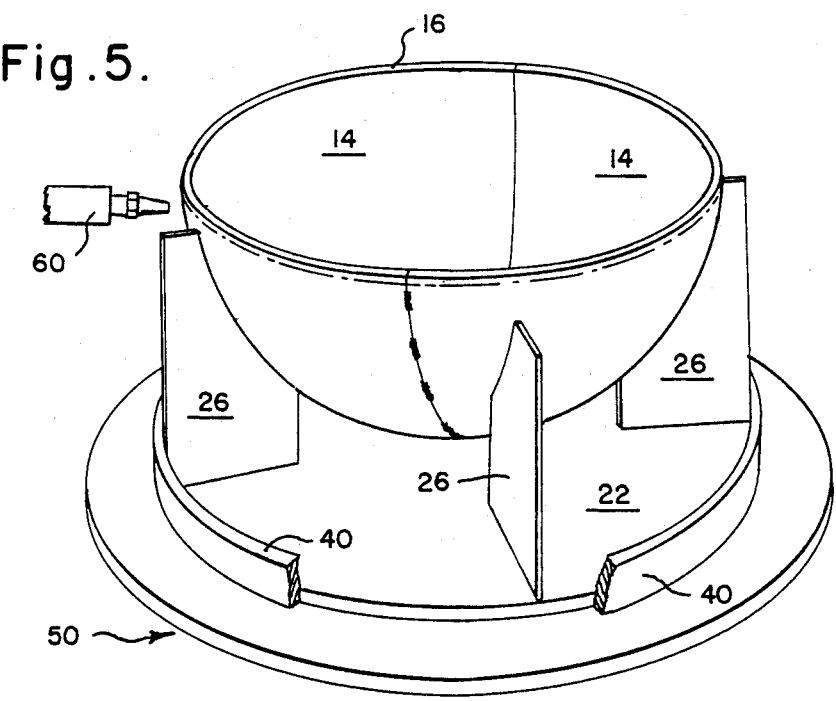
FIG. 5 is a cross sectional view of a turntable means having a centering ring into which the trim jig means of the present invention is positioned.

As shown in FIG. 2, the first edge 16 of lune section 14 is aligned with the upper ends of plates 27. Securing means 24 is then tightened to hold the section 14 in a desired position. If desired, the removable extension plates 27 of guide members 26 may be removed after the section 14 is properly secured to provide sufficient space for unencumbered trimming. The trim jig means 20 is then placed into centering ring 40 of rotating table member 50 as shown in FIG. 5. Cutting of section 14 may be accomplished by rotating table 50 relatively to a stationary plasma torch 60.

Once section 14 is properly aligned relative to guide members 26 a first edge 16 is trimmed to leave approximately ¾ inch of excess material away from a desired trim line 30. Once edge 16 is trimmed, section 14 is repositioned on trim jig means 20 so that a second edge 18 is aligned with the extension plates 27. Member 14 is again secured into position with securing means 24 and edge 18 is trimmed precisely to a desired trim line in the manner described above.

Figure 3:
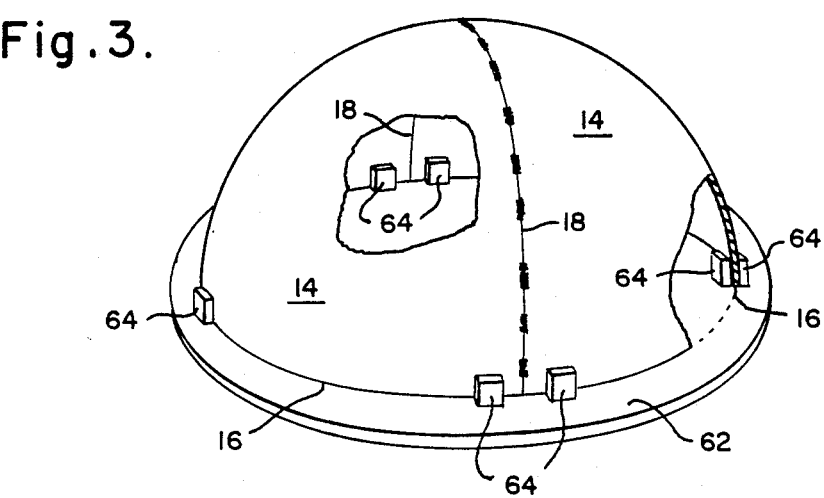
FIG. 3 is an isometric view of the joining jig means of the present invention having two three dimensional sections positioned thereon.

Referring to FIG. 3, once a pair of members 14 have been trimmed in the manner described above, the two members 14 are placed with the trim to line edges 18 juxtaposed on a joining jig means 60. Joining jig means 60 preferably includes a generally circular base member 62 having a plurality of spaced pairs of aligning blocks 64 positioned about the outer periphery of base 62 adapted to engage and secure an inner and outer surface of edges 16 of the two members 14. Blocks 64 are utilized to secure the two members 14 in a properly aligned relative position so that they may be tack welded or otherwise joined together.

Figure 4:
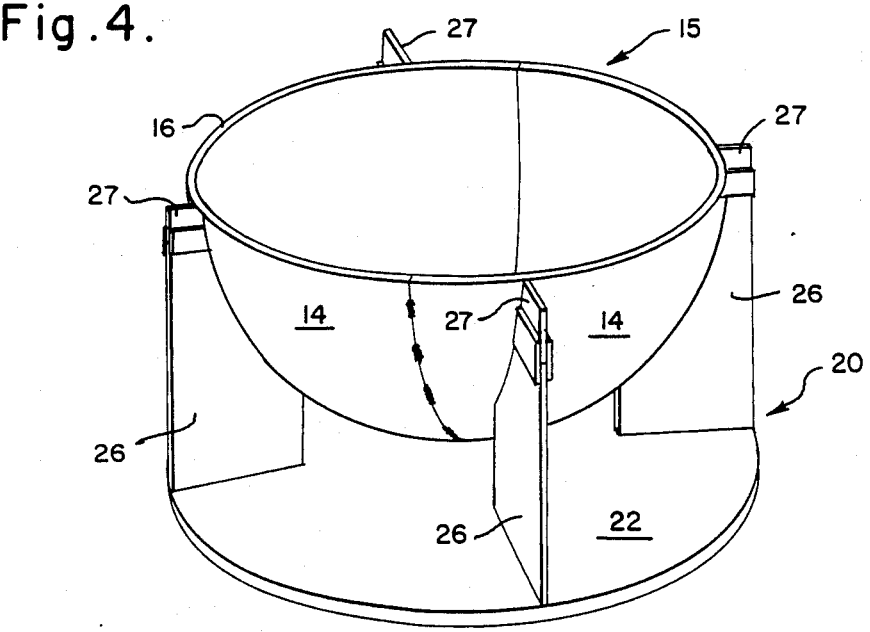
FIG. 4 is an isometric view of the trim jig means of the present invention having a hemispherical member aligned therein.

Referring to FIG. 4, once the two members 14 are joined together to form a hemispherical member 15, member 15 is again placed in trim jig means 20 and aligned so that an upper edge portion 16 thereof is an equal distance from the uppermost surface of extension plates 27 of guide members 26. Trim jig means 20 is again placed in centering ring 40 of turntable 50 and the excess ¾ inch material is trimmed from edge 16 by rotating turntable 50 relative to a stationary plasma torch 60.

It will be appreciated by those skilled in the art that the method of the present invention, by the utilization of trim jig means and joining means to form and interconnect a pair of sections, provides a method of forming extremely accurate hemispherical tank heads in a simplified manner.

While I have described certain presently preferred embodiments of the present invention, the invention is not limited thereto and may be otherwise variously practiced within the scope of the following claims.

I claim:
1. A method of manufacturing hemispherical tank heads comprising:
   (a) cutting a pair of planar lune members from flat metal stock;
   (b) forming each of said planar lune members into three-dimensional curved lune sections each having a shape defined by rotating an arc which extends from pole to pole of a chosen sphere through a chosen distance;
   (c) sequentially placing each curved lune section into trim jig means having plural guide members and adjusting the section thereon so that a first edge of the section is an equal distance from each of said guide members and trimming the first edge leaving at least some excess material beyond a desired trim line;
   (d) repositioning each curved lune section so that a second edge of the section is an equal distance from each of the guide members and trimming the second edge of each section to a desired trim line;
   (e) placing two trimmed curved lune sections on a joining jig means with the second edges of the sections juxtaposed and joining the second edges together to form a hemispherical member; and
   (f) placing the hemispherical member into trim jig means, adjusting the hemispherical member so that said first edges are substantially an equal distance from each of the guide members and trimming the excess material from the first edges.

2. A method according to claim 1 wherein said trim jig means is rotated during all trimming operations.

3. A method according to claim 2 wherein said trimming jig has a circular base member and said trimming jig is placed into a centering ring mounted to a turntable means for all trimming operations.

4. A method according to claim 1 wherein said planar lune members are formed of stainless steel.

5. A method according to claim 1 wherein said planar lune members are cut to have a length approximately one half a width thereof.

6. A method according to claim 1 wherein said curved lune sections and said hemispherical member are secured to the trim jig means following adjustment thereon and prior to trimming.

7. A method according to claim 6 wherein extension plates of said guide means are removed from the trim jig means prior to trimming.

8. A method according to claim 1 wherein said curved lune sections are formed by heating the planar lune members and pressing with suitable press and die means.

9. A method according to claim 8 wherein said planar lune members are heated for approximately 40 minutes at approximately 1950° F. and water quenched prior to pressing.

10. A method according to claim 8 wherein said planar lune members are pressed from the center outwardly and outermost edges of the lune members are not present.

11. A method according to claim 1 wherein said curved lune sections are placed on the joining jig means with said first edges thereof are positioned in alignment with aligning blocks provided on said joining jig means.

12. A method according to claim 1 wherein the hemispherical member has a diameter greater than 48 inches.

* * * * *